(12) United States Patent
Shin et al.

(10) Patent No.: US 9,047,138 B2
(45) Date of Patent: Jun. 2, 2015

(54) APPARATUS AND METHOD FOR THREAD SCHEDULING AND LOCK ACQUISITION ORDER CONTROL BASED ON DETERMINISTIC PROGRESS INDEX

(75) Inventors: Young Sam Shin, Hwaseong-si (KR); Seung Won Lee, Hwaseong-si (KR); Min Young Son, Yongin-si (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 778 days.

(21) Appl. No.: 13/099,453

(22) Filed: May 3, 2011

(65) Prior Publication Data

US 2012/0023505 A1 Jan. 26, 2012

(30) Foreign Application Priority Data

Jul. 22, 2010 (KR) ........................ 10-2010-0070964

(51) Int. Cl.
*G06F 9/46* (2006.01)
*G06F 9/52* (2006.01)
*G06F 9/48* (2006.01)

(52) U.S. Cl.
CPC .............. *G06F 9/526* (2013.01); *G06F 9/4881* (2013.01)

(58) Field of Classification Search
None
See application file for complete search history.

(56) References Cited

U.S. PATENT DOCUMENTS

| 7,448,036 B2 | 11/2008 | Brenner et al. | |
| 7,725,897 B2 | 5/2010 | Hamaoka | |
| 2004/0093602 A1* | 5/2004 | Huston et al. | 718/107 |
| 2005/0223274 A1 | 10/2005 | Bernick et al. | |
| 2007/0039000 A1* | 2/2007 | Lakshmikantha et al. | 718/100 |
| 2009/0106539 A1 | 4/2009 | Mericas | |
| 2009/0119549 A1* | 5/2009 | Vertes | 714/47 |
| 2009/0144742 A1 | 6/2009 | Subhraveti et al. | |

FOREIGN PATENT DOCUMENTS

| KR | 10-2001-0103719 | 11/2001 |
| KR | 10-2003-0018048 | 3/2003 |
| KR | 10-2005-0054940 | 6/2005 |

OTHER PUBLICATIONS

Reliable Logical Clocks for Unreliable Process Groups Achour Mostefaoui, Michel Raynal, Makoto Takizawa Chapter 5 of "Dependable Network Computing" Published: 2000.*
JaRec: a portable record/replay environment for multi-threaded Java applications A. Georges, M. Christiaens, M. Ronsse and K. De Bosschere Published 2004.*

(Continued)

*Primary Examiner* — Emerson Puente
*Assistant Examiner* — Paul Mills
(74) *Attorney, Agent, or Firm* — NSIP Law

(57) ABSTRACT

Provided is a method and apparatus for ensuring a deterministic execution characteristic of an application program to perform data processing and execute particular functions in a computing environment using a micro architecture. A lock controlling apparatus based on a deterministic progress index (DPI) may include a loading unit to load a DPI of a first core and a DPI of a second core among DPIs of a plurality of cores at a lock acquisition point in time of each thread, a comparison unit to compare the DPI of the first core and the DPI of the second core, and a controller to assign a lock to a thread of the first core when the DPI of the first core is less than the DPI of the second core and when the second core corresponds to a last core to be compared among the plurality of cores.

9 Claims, 14 Drawing Sheets

(56) References Cited

OTHER PUBLICATIONS

DMP: Deterministic Shared Memory Multiprocessing Joseph Devietti, Brandon Lucia, Luis Ceze, Mark Oskin Published Mar. 2009.*

Cycle-Accurate Deterministic Multithreading for Multicore Debugging and Reliability Youngsam Shin, Minyoung Son, Seungwon Lee, and Shihwa Lee Published: 2012.*

Predictable Multithread Scheduling with Cycle—Accurate Thread Progress Monitor Youngsam Shin, Seungwon Lee, Minyoung Son, and Shihwa Lee Published: Mar. 25, 2011.*

Accelerated Deterministic Multithreading for Multichannel Video Decoder Youngsam Shin, Minyoung Son, Seungwon Lee, and Shihwa Lee Published: Jul. 20, 2012.*

European Search Report dated Feb. 10, 2012 issued in corresponding European Patent Application No. 11174341.5.

Marek Olszewski et al., "Kendo: Efficient Deterministic Multithreading in Software", NewsletterACM SIGPLAN Notices, vol. 44, No. 3, 2009, pp. 97-108.

Henry Hoffman et al. "Application Heartbeats for Software Performance and Health," MIT, Technical Report 2009. Jan. 2010. 2pg.

Marek Olszewski et al. "Kendo: Efficient Deterministic Multithreading in Software," MIT, ASPLOS Mar. 2009. 12pg.

Steven Cameron Woo et al. "The SPLASH-2 Programs: Characterization and Methodological Considerations," Stanford University ISCA Jun. 1995. 13pg.

Terence Kelly et al. "Eliminating Concurrency Bugs with Control Engineering," IEEE Computer 2009. (p. 52-60).

Brinkley Sprunt, "The Basics of Performance-Monitoring Hardware," IEEE Micro, v.22 n. 4, p. 64-71, Jul. 2002.

* cited by examiner thread racing for acquiring lock A

APPARATUS AND METHOD FOR THREAD SCHEDULING AND LOCK ACQUISITION ORDER CONTROL BASED ON DETERMINISTIC PROGRESS INDEX

CROSS-REFERENCE TO RELATED APPLICATIONS

This application claims the priority benefit of Korean Patent Application No. 10-2010-0070964, filed on Jul. 22, 2010, in the Korean Intellectual Property Office, the disclosure of which is incorporated herein by reference.

BACKGROUND

1. Field

Example embodiments relate to a method and apparatus for ensuring a deterministic execution characteristic of an application program to perform data processing and execute predetermined functions in a computing environment using a micro architecture.

2. Description of the Related Art

As distribution of portable devices and an amount of information processing increases, computing devices become complex and a variety of applications are simultaneously performed. In addition, due to an increase in applications such as a multimedia application using real-time processing, an interest in a system performance of the computing devices has been increasing. However, a variety of applications may not be effectively processed using a single processor alone.

To overcome the above circumstance, integrated semiconductor technology has been developed and multi-processor computing technology has been introduced. Compared to a single processor, a multi-processor may have relatively high energy efficiency and show significant performance improvement. However, the design and development of a system using the multi-processor may not be readily performed. In addition, verification of a parallel system may be difficult. A verification cost of the system having a parallel system may increase in proportion to a square of a number of cores with respect to a development period of an existing sequential system. A variety of schemes have been proposed to reduce the verification cost. A basic purpose for effectively configuring the variety of schemes is to accurately measure the performance and progress state of the application program executing the variety of instructions. Also, while a thread execution order is maintained to be constant at all times, a waiting time for execution of a priority thread may need to be minimized.

SUMMARY

The foregoing and/or other aspects are achieved by providing a lock controlling apparatus, based on a deterministic progress index (DPI), the apparatus including: a loading unit to load a DPI of a first core and a DPI of a second core among DPIs of a plurality of cores at a lock acquisition point in time of each thread, the first core for reference and the second core corresponding to a neighbor core; a comparison unit to compare the DPI of the first core and the DPI of the second core; and a controller to assign a lock to a thread of the first core when the DPI of the first core is less than the DPI of the second core and when the second core corresponds to a last core to be compared among the plurality of cores.

When the DPI of the first core has the same value as the DPI of the second core, and when an identification (ID) of the first core has a value less than an ID of the second core, the controller may assign the lock to the thread of the first core.

When the second core is not the last core to be compared among the plurality of cores, the loading unit may load a DPI of a third core among the plurality of cores.

The apparatus may further include: a core DPI generator to generate a core DPI by accumulating thread DPIs of a predetermined thread group executed in the same core; and a memory unit to store the generated core DPI.

The predetermined thread group may correspond to a group of threads attempting a lock acquisition to access the same shared resource.

The apparatus may further include a core DPI correction unit to correct the DPI of the first core by a measurement value of a non-deterministic section through actual application execution.

The foregoing and/or other aspects are achieved by providing a thread scheduling apparatus based on a deterministic progress index (DPI), the apparatus including: a measurement unit to measure a DPI of a thread executed with respect to a predetermined input; a database to store a DPI of each thread at a lock acquisition point in time based on the measured DPI of the thread; and a controller to schedule a thread execution order in an ascending order of a thread DPI at a next lock acquisition point in time from a corresponding lock acquisition point in time, based on the stored DPI of each thread.

The controller may schedule the thread execution order in an ascending order of an increased value in the thread DPI at the next lock acquisition from the corresponding lock acquisition point in time.

The foregoing and/or other aspects are achieved by providing a lock controlling method based on a deterministic progress index (DPI), the method including: loading a DPI of a first core and a DPI of a second core among DPIs of a plurality of cores at a lock acquisition point in time of each thread, the first core for reference and the second core corresponding to a neighbor core; comparing the DPI of the first core and the DPI of the second core; and assigning a lock to a thread of the first core when the DPI of the first core is less than the DPI of the second core and when the second core corresponds to a last core to be compared among the plurality of cores.

The assigning may include assigning the lock to the thread of the first core when the DPI of the first core has the same value as the DPI of the second core, and when an identification (ID) of the first core has a value less than an ID of the second core.

The assigning may include loading a DPI of a third core among the plurality of cores when the second core is not the last core to be compared among the plurality of cores.

The method may further include: generating a core DPI using a DPI of a previous thread as a DPI start point in time of a next thread when a context switch event occurs in the same core; and storing the generated core DPI.

The method may further include correcting the DPI of the first core by a measurement value of a non-deterministic section through actual application execution.

The method may further include measuring a minimum value and a maximum value of the non-deterministic section. The correcting may include correcting the DPI of the first core by a deterministic measurement value based on the measured minimum value and the maximum value.

The foregoing and/or other aspects are achieved by providing a thread scheduling method based on a deterministic progress index (DPI), the method including: measuring a DPI of a thread executed with respect to a predetermined input;

storing a DPI of each thread at a lock acquisition point in time based on the measured DPI of the thread; and scheduling a thread execution order in an ascending order of a thread DPI at a next lock acquisition point in time from a corresponding lock acquisition point in time, based on the stored DPI of each thread.

The scheduling may include scheduling the thread execution order in an ascending order of an increased value in the thread DPI at the next lock acquisition from the corresponding lock acquisition point in time.

The example embodiments may include a lock controlling method based on a DPI that may be configured with relatively small costs using a hardware function provided in a general micro architecture.

The example embodiments may also include a lock controlling apparatus based on a DPI that may effectively control a thread lock order using a DPI based on a core unit.

The example embodiments may also include a lock controlling apparatus based on a DPI that may provide, using significantly small runtime overhead, a deterministic execution environment of programs to be processed in parallel in a multi-core processor.

The example embodiments may also include a lock controlling apparatus based on a DPI that may minimize a priority thread waiting overhead by correcting DPIs of multiple cores.

The example embodiments may also include a thread scheduling apparatus based on a DPI that may provide deterministic thread scheduling suitable for an execution characteristic of an application program.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
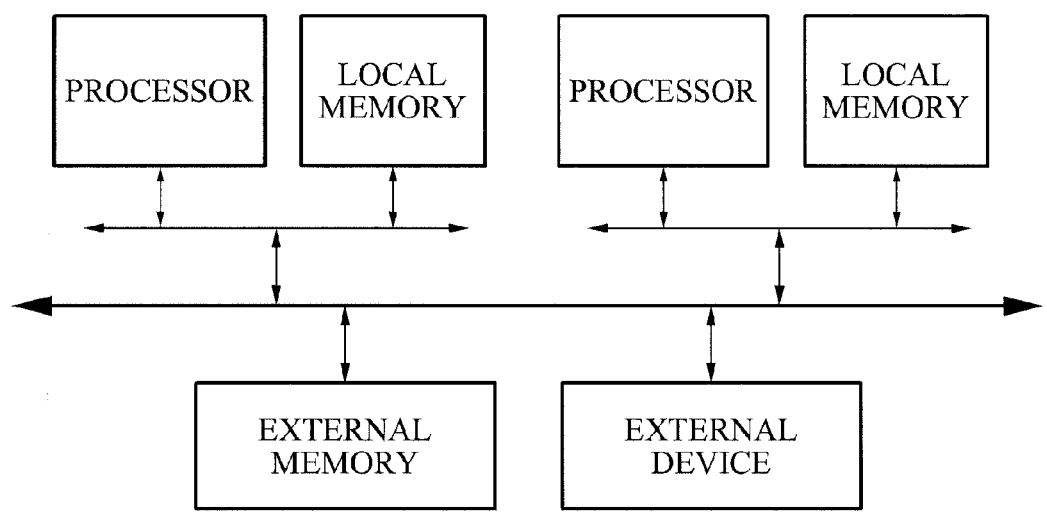
FIG. 1 illustrates a computing environment where a general application program is executed in a conventional art.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a computing environment where a general application program is executed in a conventional art.

The general application program may perform a predetermined function by employing, as resources, a memory and a hardware device in a processor. In general, the memory has a hierarchical structure. In this instance, when an access speed of the memory is to be relatively fast, contents of the memory may be provided to a local bus. When the access speed of the memory is relatively slow, and is to be relatively inexpensive, the memory may be provided to a system bus. To satisfy a high performance requirement, a multi-processor may perform parallel processing of the application program by integrating processors in a single system.

The general application program may include at least one thread. Accordingly, multiple threads may be executed in a single processor. The processor may be used for the same meaning as a core. Multiple threads being executed in the single processor or core is referred to as multi-threading. Accordingly, to measure a performance and a progress state of the application program, a performance and a progress state of the at least one thread constituting the application program may be measured. A method of measuring a thread performance and progress state may include a method of using a deterministic progress index (DPI). A thread may include instructions to execute a particular function. An instruction execution scheme may be classified into a deterministic execution scheme and a non-deterministic execution scheme. When the instruction execution scheme corresponds to the deterministic execution scheme, times when an execution of a corresponding instruction are completed or times when an execution of an instruction group are completed may have a regular cycle. When the instruction execution scheme corresponds to the non-deterministic execution scheme, times when the execution of the instruction are completed or the times when the execution of the instruction group is completed may have an irregular cycle.

The DPI corresponds to a value indicating only a deterministic execution section excluding a non-deterministic section in a thread execution, and may be generated using a deterministic progress counter (DPC). A DPI of a thread may be used as an index for measuring a progress state of the thread. The non-deterministic execution section and the deterministic execution section may be distinguished from each other based on a predetermined criterion. The DPI of the thread may be stored in a DPI exclusive memory or a general memory. FIG. 1 illustrates an example of a generally configurable computing environment. An application environment of a DPI-based lock order controlling and thread scheduling apparatus according to example embodiments is not limited to the example of FIG. 1.

Figure 2:
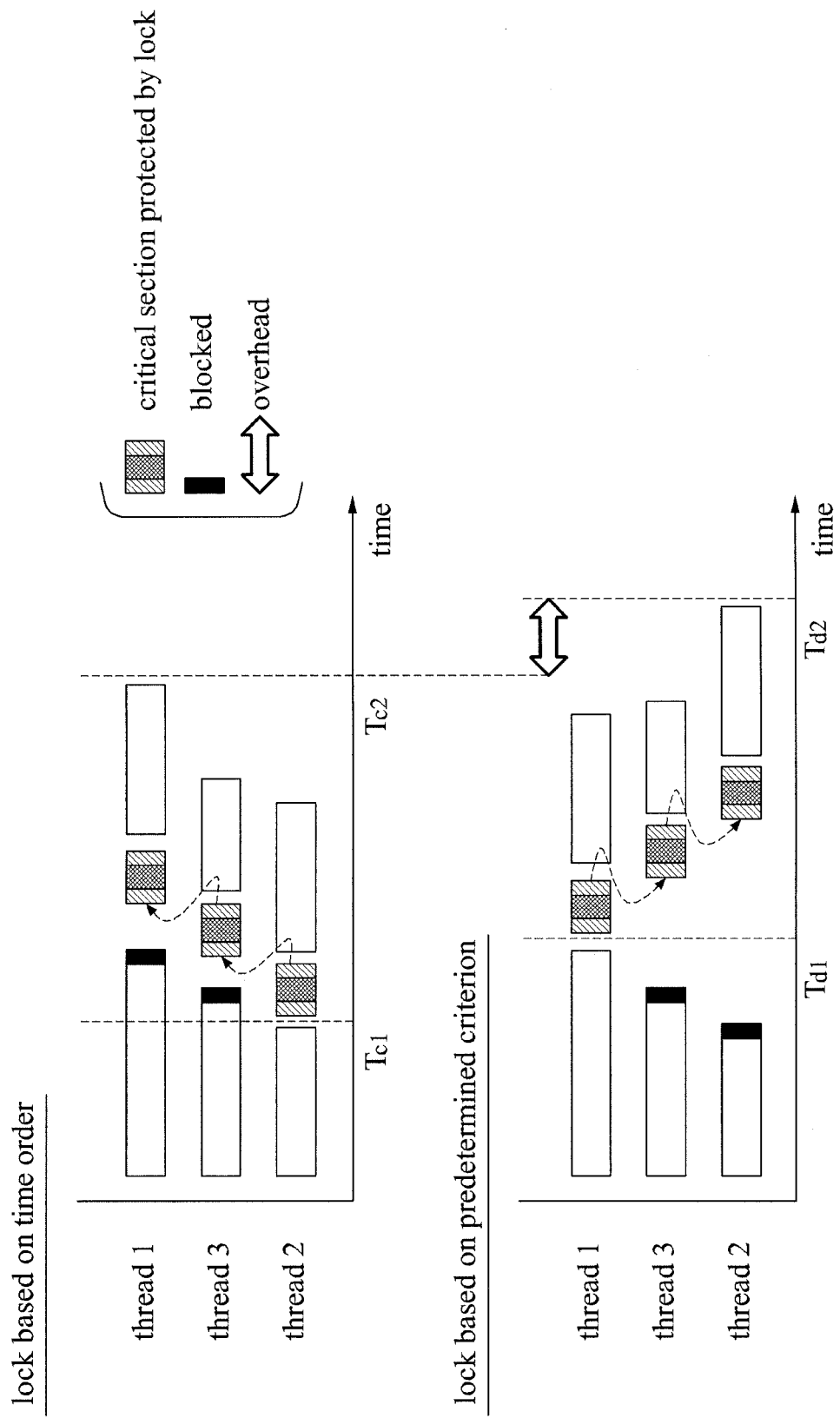
FIG. 2 illustrates a general parallel execution and a parallel execution using a deterministic scheme.

FIG. 2 illustrates a general parallel execution and a parallel execution using a deterministic scheme.

In the case of the general parallel execution, a lock acquisition may be determined based on a time order with respect to a lock acquisition attempt. In the parallel execution according to the deterministic scheme, a lock acquisition may be determined based on a predetermined criterion regardless of the above order. The parallel execution using the deterministic scheme may be expressed by a deterministic execution scheme. The deterministic execution scheme ensures a thread execution order and thus, the same output for the same input may be ensured. The deterministic execution scheme may effectively solve a simultaneity issue occurring as a result of the parallel execution in multiple cores.

However, the deterministic execution scheme may deteriorate a performance by artificially controlling a thread execution. For example, in the case of the general parallel execution, a thread initially executed based on a time order may be executed according to a priority. However, in the case of the deterministic execution scheme, the thread may be executed based on a predetermined order or criterion. Accordingly, for a thread to be executed before a prior ingress thread to acquire a lock based on a time, an execution is to be suspended and paused. In addition, the deterministic execution scheme may use a memory access to control an execution order and may generate overhead by using an additional computer resource to determine the execution order.

The deterministic execution scheme may be classified into a strong deterministic execution scheme for ensuring a deterministic order with respect to all the memory accesses of parallel programs and a weak deterministic execution scheme for ensuring the deterministic order only with respect to a shared memory access. The strong deterministic execution scheme may use a separate hardware module to ensure an order with respect to all the memory accesses. When the hardware module is not supported, a performance may be significantly deteriorated. The weak deterministic execution scheme may use a hardware function provided in a general micro architecture to ensure a lock acquisition order with respect to the shared memory. Accordingly, the weak deterministic execution scheme may not use a complex hardware module and may ensure an acquisition order with respect to all the locks occurring while executing an application in a software manner using a DPI.

Referring to FIG. 2, the general parallel execution may use a lock acquisition based on a time order. In this instance, the time order may include chronological order. Thread 1, thread 2, and thread 3 are executed in different cores. Since an execution time of the thread 2 is shortest, the thread 2 may initially make a lock acquisition request. A lock acquisition request of each thread, such as an exclusive read and write, may be performed using a memory. Each thread may acquire a corresponding lock to prevent another thread from accessing the shared memory. For example, it is possible to atomically prevent an access of the other thread to the shared memory through the lock acquisition. When the thread 2 initially requests the lock acquisition, accesses of the thread 1 and the thread 3 with respect to the shared memory may be blocked even though the execution time has ended. The thread 3 may request a lock acquisition after the thread 2 acquires the lock and a critical section protected by lock is terminated. After the thread 3 acquires the lock, the thread 1 may acquire a lock. That is, the general parallel execution may make the lock acquisition request in an ascending order of a physical execution time. In the general parallel execution, a thread execution state may not be predicted and an order where a corresponding thread reaches a lock acquisition point in time may not be predicted.

When a lock acquisition order of each thread is known, it is possible to reduce costs for verifying a stable execution of a developed application program. When the lock acquisition order of each thread accessing the shared memory is determined based on a predetermined criterion according to the weak deterministic execution scheme, the verification costs may be reduced. Referring to FIG. 2, the lock acquisition request is made based on the predetermined criterion, that is, the weak deterministic execution scheme. Since the lock acquisition order is determined in an order of the thread 1, the thread 3, and the thread 2, the thread 1 may most initially request a lock acquisition even though the thread 1 has a longest execution time. Since the lock acquisition order is determined based on the predetermined criterion, a deterministic execution order may be known. The predetermined criterion may be DPIs of threads. When DPIs of threads are the same, the predetermined criterion may be order of a thread ID.

When the lock acquisition order is ensured for deterministic execution, a lower priority thread may reach a lock acquisition point in time prior to a priority thread. In this example, the lower priority thread may wait until the priority thread acquires a lock. That is, compared to the lock acquisition request based on the chronological order, the total execution time may be delayed by an amount of time $T_{d2}-T_{c2}$. $T_{d2}-T_{c2}$ corresponds to a performance delay time occurring due to waiting of lower priority threads during an actual deterministic execution.

The weak deterministic execution scheme may use a DPI of each thread as a criterion for determining the lock acquisition order of each thread. When the lock acquisition order is desired to be determined in an ascending order of a thread DPI, DPIs of all the threads may need to be read from a memory. The performance delay time may be determined based on a number of threads of which orders are to be determined and an access speed to a memory. DPIs may need to be stored in a shared memory space accessible from all the cores. In general, since the shared memory exists in a secondary memory in multiple cores, the access speed may be slow. Accordingly, during a process of comparing a relatively large number of thread DPIs, the performance may be significantly deteriorated. In the case of an application program corresponding to frequent lock attempts, the performance may be further deteriorated. A most significant performance deterioration may occur during waiting overhead that waits for a priority thread. Based on experiments, due to the waiting overhead, an average of at least 16% deterioration in performance and a maximum of at least 70% deterioration in performance may occur, depending on a characteristic of an application program.

Accordingly, there is a desire for a method of reducing a waiting time of a priority thread while using a weak deterministic execution scheme to verify a stability of an application program in multiple cores. A deterministic execution scheme described below corresponds to the weak deterministic execution scheme.

Figure 3A:
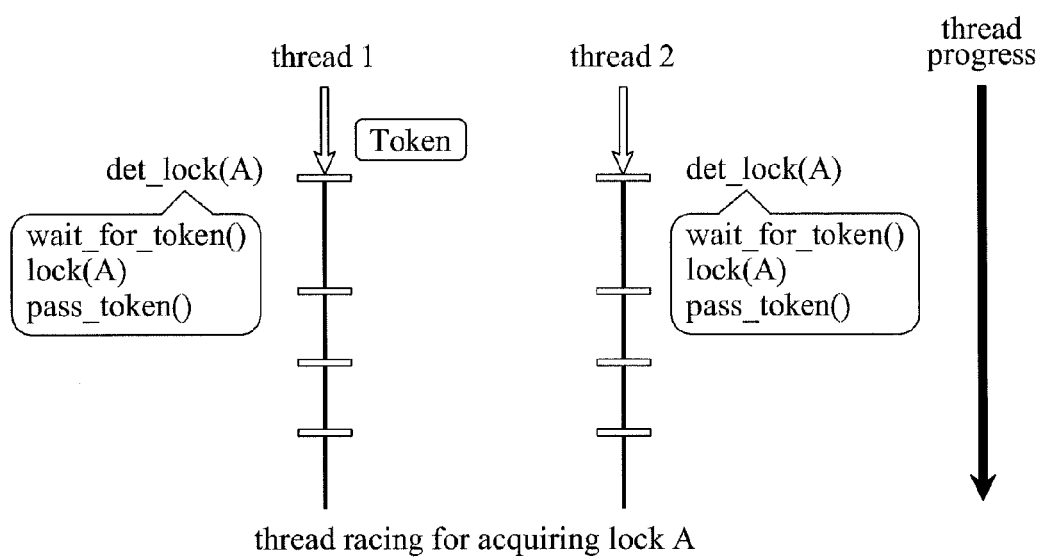
FIG. 3A and FIG. 3B illustrate a deterministic parallel execution in the case of a balanced lock acquisition (BLA) and an imbalanced lock acquisition (IBLA)
Figure 3B:
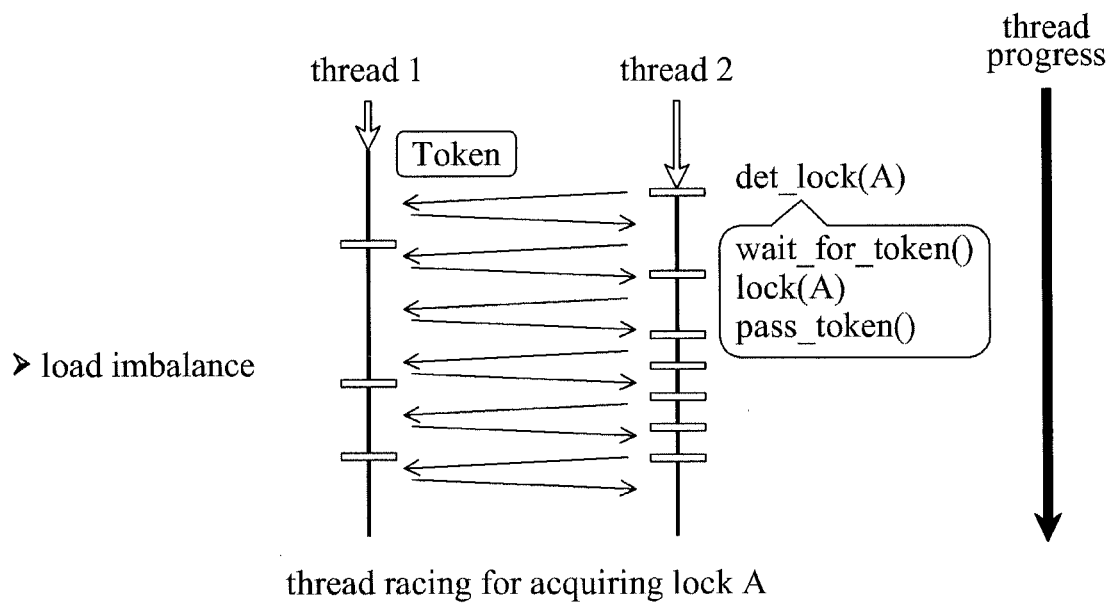

FIG. 3A and FIG. 3B illustrate a deterministic parallel execution in the case of a balanced lock acquisition (BLA) and an imbalanced lock acquisition (IBLA).

When controlling a lock acquisition order of a thread using a deterministic execution scheme, waiting overhead and lock acquisition thread selection overhead may occur. In this example, the overhead may differently occur based on a lock acquisition pattern of each thread. The lock acquisition pattern may be classified into a BLA pattern and an IBLA pattern.

The BLA pattern corresponds to a case where the same lock acquisition pattern is performed in parallel in multiple cores, and includes a case where the same instruction and the same input point in time is used. For example, threads executed in the multiple cores may perform the same work and request a lock acquisition at the same point. When the lock acquisition pattern of the threads corresponds to the BLA pattern, the threads may request the lock acquisition at the nearly same point in time and thus, the performance deterioration by the waiting overhead may be relatively small. The lock acquisition thread selection overhead occurring while determining a lock acquisition order may be relatively great. Accordingly, in the case of the BLA pattern, a significant performance difference may occur depending on a method of determining the lock acquisition order.

The IBLA pattern corresponds to a case where different lock acquisition patterns are performed in parallel in multiple cores, and includes a case where instructions of threads and input points in times are different. The IBLA pattern may ensure deterministic execution between application programs having different lock acquisition patterns with different instructions. In general, lock acquisition points in times of threads are different and thus, waiting overhead that waits for a thread having a prior DPI may relatively increase.

FIG. 3A illustrates an example of the BLA pattern. Referring to FIG. 3A, due to the same instruction and the same input point in time, a point in time when thread 1 requests a lock acquisition is similar to a point in time when thread 2 requests a lock acquisition while a thread progress is ongoing. Here, the term "token" indicates the lock acquisition, and det_lock(A) indicates a pseudocode requesting acquisition of lock A, for example, wait_for_token( ) lock(A), pass_token( ). To acquire the lock A, the thread 1 and the thread 2 may perform thread racing, and a lock A acquisition order may be determined based on a predetermined criterion. The predetermined criterion may be DPIs of threads. When DPIs of threads are the same, the predetermined criterion may be order of a thread ID.

FIG. 3B illustrates an example of the IBLA pattern. Referring to FIG. 3B, a point in time when thread 1 requests a lock acquisition is different from a point in time when thread 2 requests a lock acquisition. The thread 2 initially requests acquisition of lock A and then, the thread 1 requests acquisition of lock A at a different point in time from the thread 2. Load imbalance indicates that instructions of threads and input points in times of the instructions are different and thus, points in times of lock acquisition requests are different.

Figure 4A:
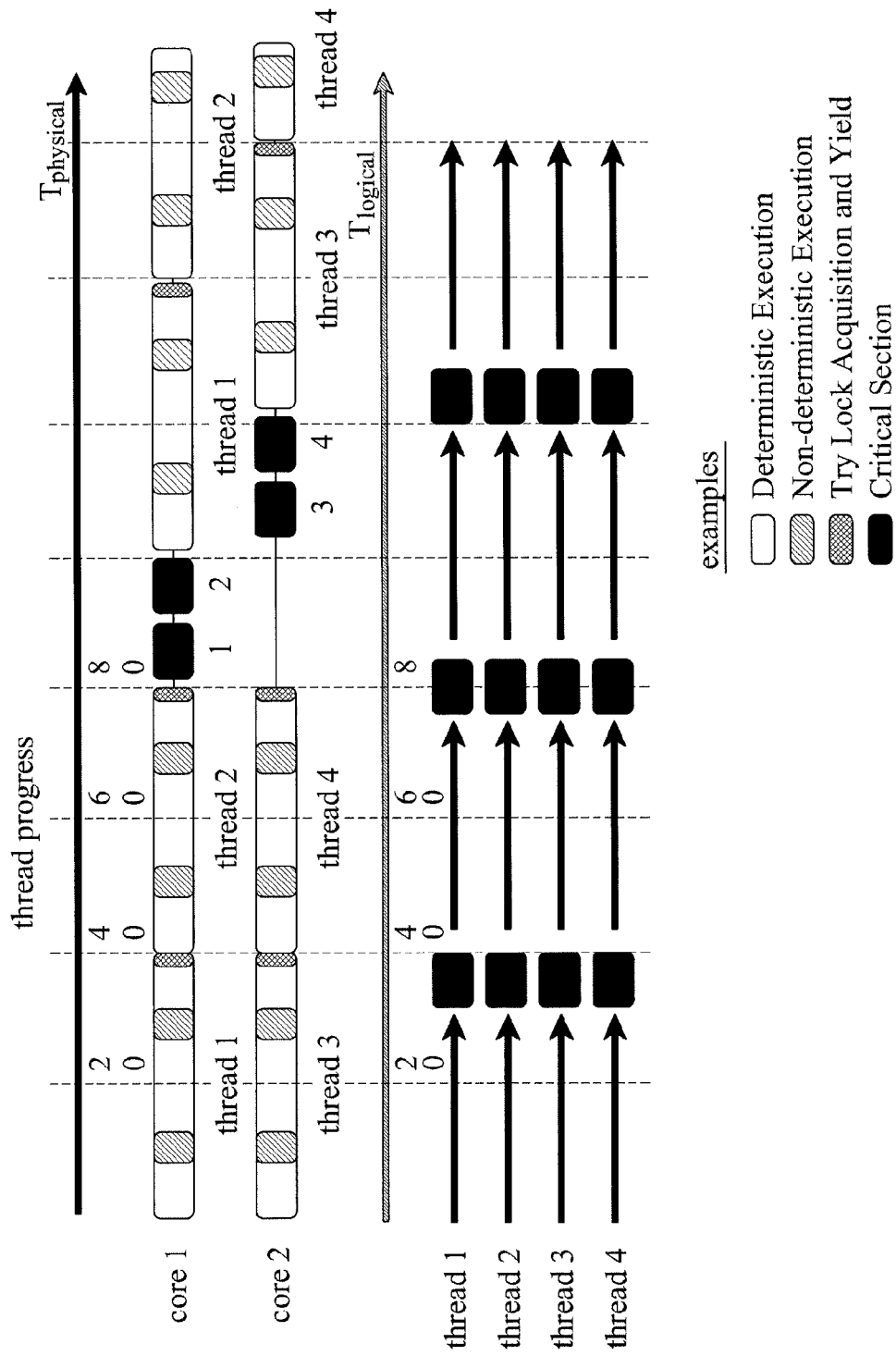
FIG. 4A and FIG. 4B illustrate a deterministic progress index (DPI) criterion execution for each thread in the case of a BLA and an IBLA.
Figure 4B:
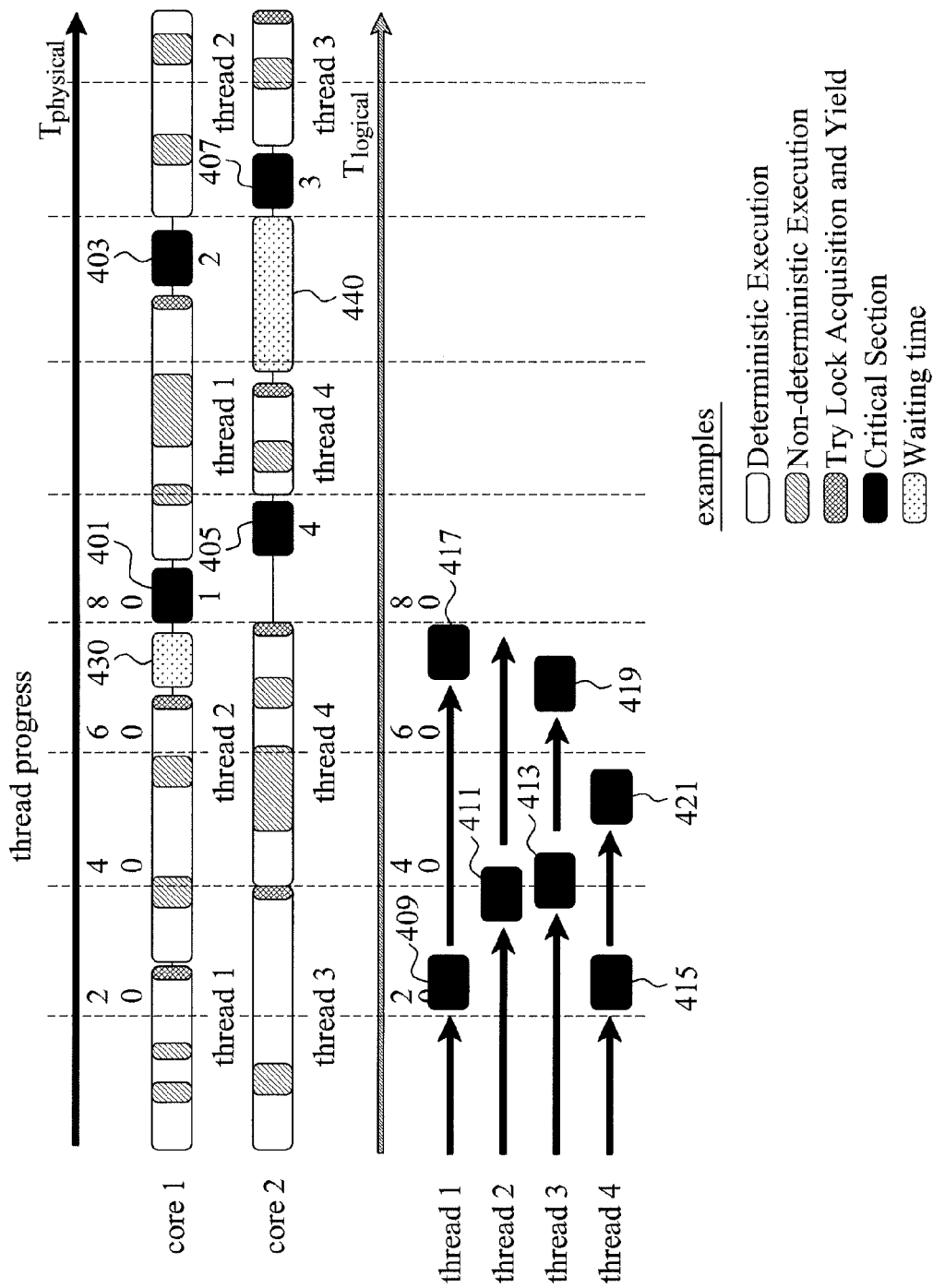

FIG. 4A and FIG. 4B illustrate a DPI criterion execution for each thread in the case of a BLA and an IBLA.

A size of each thread DPI may be known using a length of an arrow indicator based on $T_{logical}$. $T_{logical}$ indicates a DPI concept of indexing a logical time.

Referring to FIG. 4A, since thread (1) through thread (4) have the same DPI size and the same lock acquisition point in time, a lock acquisition pattern may correspond to a BLA pattern. In core 1, the thread (1) and the thread (2) are executed. In core 2, the thread (3) and the thread (4) are executed. When a DPI of a corresponding thread is smallest at a lock acquisition point in time, or when DPIs of threads are the same, a lock acquisition order may be determined based on an ascending order of a thread ID. In the core 1, physical time $T_{physical}$ where the thread (1) is actually executed uses a deterministic execution section and a non-deterministic execution section. Accordingly, compared to a DPI using only the deterministic execution section, a relatively long time may be used. When the execution of the thread (1) is terminated, a DPI of the thread (2) becomes 0 and thus, the thread (2) may be executed. Initial execution of the thread (1) may be determined by thread scheduling. Even though the thread (1) attempts to acquire a lock, the thread (1) yields the execution to the thread (2) since the DPI of the thread (2) is relatively small. When the execution of the thread (2) is terminated, the thread (1) and the thread (2) may request a lock acquisition and a critical section may be protected by the acquired lock. The critical section corresponds to a section where accesses of the thread (3) and the thread (4) in the core 2 with respect to a shared memory are blocked.

In the core 2, the thread (3) and the thread (4) may be executed using the same scheme as used in the core 1. Since the thread (3) and the thread (4) have a relatively great thread ID, the thread (3) and the thread (4) may have a lower priority order compared to the lock acquisition order of the thread (1) and the thread (2). Since the lock acquisition pattern corresponds to the BLA pattern, a method of determining the lock acquisition order of the thread (1) and the thread (2) may significantly affect the performance.

Referring to FIG. 4B, since thread (1) through thread (4) have different DPI sizes and different lock acquisition points in times, a lock acquisition pattern may correspond to the IBLA pattern. When a DPI of a corresponding thread is smallest at a lock acquisition point in time, or when DPIs of threads are the same, a lock acquisition order may be determined based on an ascending order of a thread ID. Among the thread (1) through the thread (4), a DPI sizes follow thread (3) 413>thread (2) 411>thread (1) 409=thread (4) 415. The DPI size of the thread (1) is the same as the DPI size of the thread (4) as "20". However, since a thread ID of the thread (1) is smaller than the thread (4), the thread (1) may request a lock acquisition prior to the thread (4). In core 1, even though the thread (1) requests a lock acquisition after the execution of the thread (1) is terminated, the thread (1) yields the execution to the thread (2) since the DPI of the thread (2) is 0. After the execution of the thread (2) is terminated, the thread (1) may need to request the lock acquisition. However, at the point in time when the execution of the thread (2) is terminated, the DPI of the thread (4) is smaller than the DPI of the thread (2). The lock acquisition request of the thread (1) may wait until the execution of the thread (4) is terminated. Accordingly, a waiting time 430 may occur.

When the execution of the thread (4) is terminated, the thread (1) may request the lock acquisition and a critical section 401 may be protected by the acquired lock. That the protection of the critical section is terminated is referred to as "unlock". When the thread (1) is unlocked, the thread (4) may request a lock acquisition and a critical section 405 may be protected. When the thread (4) is unlocked, the thread (4) may be executed. The DPI of the thread (2) after the execution of the thread (4) is terminated is less than the DPI of the thread (3) and thus, the execution of the thread (1) may be terminated. The thread (2) may request a lock acquisition and a critical section 403 may be protected, and a waiting time 440 may occur until the thread (2) is unlocked. After the thread (2) is unlocked, the thread (3) may request a lock acquisition and a critical section 407 may be protected. In a second cycle, the thread (1) through the thread (4) have a DPI sizes of thread (2)>thread (1) 417>thread (3) 419>thread (4) 421. Accordingly, the lock acquisition order may be determined in an order of the thread (4) 421, the thread (3) 419, the thread (1) 417, and the thread (2). Since the lock acquisition pattern corresponds to the IBLA pattern, a method of adjusting the waiting overhead may affect the performance.

In the IBLA pattern, since a cycle of a non-deterministic execution section included in a thread is different, a difference may occur between an amount of time $T_{physical}$ and a DPI value using only the deterministic section. The difference indicates a non-deterministic execution section and thus, may be expressed by $T_{nd} = T_{physical} - T_{logical}$. In the IBLA pattern, a thread execution time and a non-deterministic execution section included in a corresponding thread are different between threads and thus, a waiting time of a lower priority thread may occur. The waiting time may be expressed by $T_{wait} = T_{priorthread\_nd} - T_{lowerprioritythread\_nd}$.

Accordingly, a method of quickly determining the lock acquisition order may be used in the BLA pattern and a method of minimizing waiting overhead may be used in the IBLA pattern.

Figure 5:
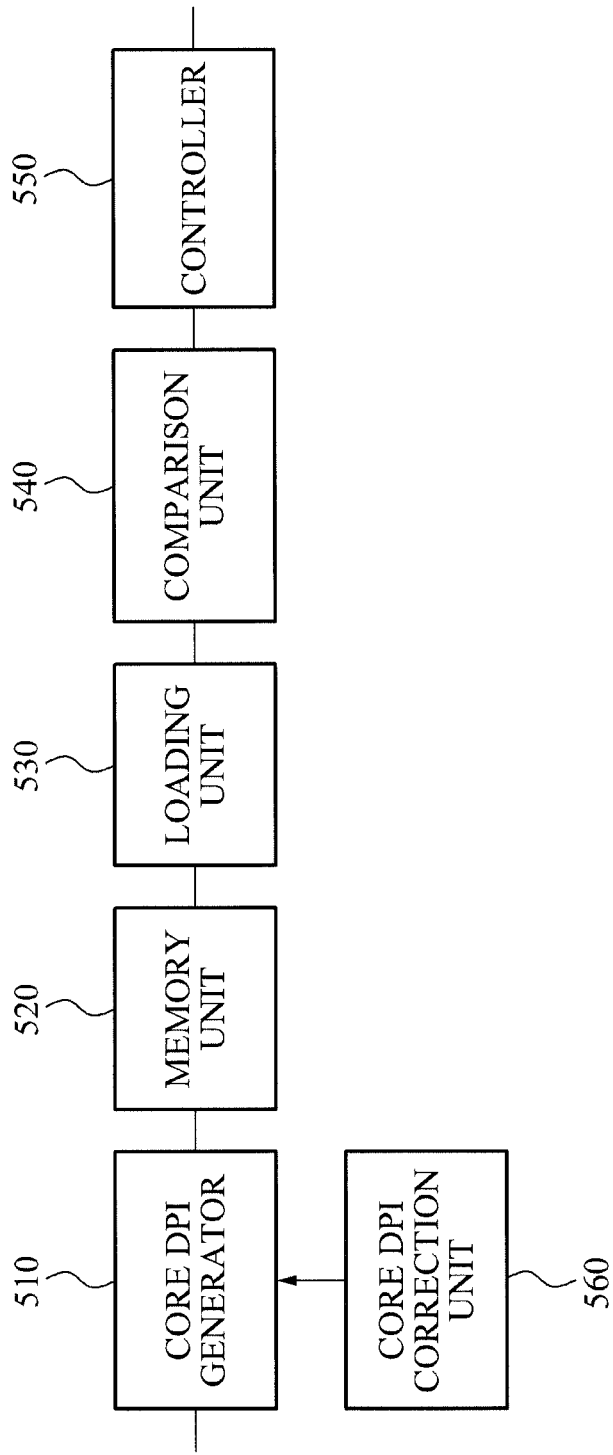
FIG. 5 illustrates a lock controlling apparatus based on a DPI according to example embodiments.

FIG. 5 illustrates a lock controlling apparatus based on a DPI according to example embodiments.

Referring to FIG. 5, the lock controlling apparatus based on the DPI may include a core DPI generator 510, a memory unit 520, a loading unit 530, a comparison unit 540, a controller 550, and a core DPI correction unit 560.

The core DPI generator 510 may generate a core DPI by accumulating thread DPIs of a predetermined thread group executed in the same core. In the case of a method of determining a lock acquisition order of each thread executed in multiple cores by comparing thread DPIs, lock acquisition selection overhead may increase in proportion to an increase in a number of threads to be compared. The core DPI generator 510 may generate a DPI for each core instead of generating a DPI for each thread. The predetermined thread group indicates a group of threads attempting a lock acquisition for accessing the same shared resource. Here, the shared resource may include a shared memory accessible by multiple cores. The predetermined thread group may include a group of threads attempting a lock acquisition for accessing a predetermined area of the shared memory and a group of threads having DPIs to be compared when determining the lock acquisition order.

The core DPI generator 510 may generate the core DPI using DPIs of the predetermined thread group of threads executed in a core. When a context switch event of a thread occurs, the core DPI generator 510 may generate a DPI based on a core unit by using a thread DPI before the event occurrence as a start point in time of a thread DPI after the event occurrence. The generated thread DPI and core DPI may be counted by a DPC.

The memory unit 520 may store the generated core DPI in a memory. The memory 520 may store the generated core DPI which is the same as when the thread DPI may be stored in a DPI memory for each thread. The memory unit 520 may include a shared memory to be accessible by multiple cores.

The loading unit 530 may load a DPI of a first core and a DPI of a second core among DPIs of a plurality of cores at a lock acquisition point in time of each thread. Here, the first core may correspond to reference core for reference and the second core may correspond to a neighbor core. To determine a lock acquisition order of a thread at a lock acquisition point in time of each thread, the loading unit 530 may load the DPI of the first core. The loading unit 530 may load the DPI of the second core that may be compared with the DPI of the first core. Here, the DPI of the second core indicates a DPI of a core that has not been loaded among the plurality of cores.

When the second core is not a last core to be compared among the plurality of cores, the loading unit 530 may load a DPI of a third core among the plurality of cores. That is, when the second core to be compared with the first core is not a finally loaded core among the plurality of cores, the loading unit 530 may load the DPI of the third core.

The comparison unit 540 may compare the DPI of the first core and the DPI of the second core. The comparison unit 540 may compare the loaded DPI of the first core with the DPI of the second core to determine the lock acquisition order of each thread at the lock acquisition point in time.

When the DPI of the first core is less than the DPI of the second core and when the second core corresponds to the last core to be compared among the plurality of cores, the controller 550 may assign a lock to a thread of the first core at the lock acquisition point in time of the first core. A criterion of determining the lock acquisition order of each thread may based on a case where a core DPI at the lock acquisition point in time is smallest or where an ID of a core is relatively small when core DPIs are the same. A criterion of determining the lock acquisition order of each thread may be set to be different depending on a type of an application program. That the controller 550 assigns a lock to a thread has the same meaning as that the thread acquires the lock. However, when the DPI of the first core is less than the DPI of the second core, or when the DPI of the first core is the same as the DPI of the second core, an ID of the first core is less than an ID of the second core, and when the second core is the last core to be compared, the controller 550 may assign the lock to the thread of the first core. The controller 550 controlling the lock indicates that the controller 550 controls the lock acquisition order.

When the DPI of the first core has the same value as the DPI of the second core, and when the ID of the first core has a value less than the ID of the second core, the controller 550 may assign the lock to the thread of the first core. However, when the DPI of the first core has a value greater than the DPI of the second core, or when the DPI of the first core has the same value as the DPI of the second core, the ID of the first core is greater than the ID of the second core, and the controller 550 may terminate controlling of the lock acquisition order.

To control the lock acquisition order of each thread, the controller 550 may compare only core DPIs instead of comparing DPIs of total threads. Since only the core DPIs are compared, a number of accesses to the shared memory may decrease compared to a case where the DPIs of the total threads are compared. Accordingly, the lock acquisition order selection overhead may decrease. In addition, since the controller 550 determines the lock acquisition order using only core DPIs indicating a progress state of cores, it is possible to avoid the effect from a thread being relatively imbalanced-scheduled due to load imbalance in the IBLA pattern. Accordingly, it is possible to decrease waiting overhead. The controller 550 may include a processor that may perform functionalities of the loading unit 530 and the comparison unit 540.

The following example corresponds to a pseudocode showing an algorithm of the controller 550 to determine the lock acquisition order. The controller 550 may control the lock acquisition order by providing an application programming interface (API) like "Boot TakeToken( )" as given by:

```
Bool TakeToken(void) {
    NextCore = NeighborCore;
    while(NextCore){
        if (MyCore->DPI > NextCore->DPI){
            return FALSE;
        }else if (MyCore->DPI == NextCore->DPI && MyCore->ID > NextCore->ID)
        {
            return FALSE;
        }
        NextCore = NextCore->neighborCore;
    }
    return TRUE;
}
```

The core DPI correction unit 560 may correct the DPI of the first core by a measurement value of a non-deterministic section through actual application execution. When the lock acquisition order is controlled using the core DPI, it may be possible to reduce a waiting time. However, a sensor thread waiting time may still occur since a non-deterministic execution section is included in a section where a corresponding thread is substantially executed in a core. The core DPI uses only the deterministic execution section excluding the non-deterministic execution section, whereas the non-deterministic execution section is included in the section where the thread is substantially executed in the core. The core DPI correction unit 560 may measure a minimum value and a maximum value of the non-deterministic execution section included in the thread that is substantially executed in the core. The measurement of the maximum value and the minimum value may be performed using a separate measurement unit (not shown). The core DPI correction unit 560 may correct the core DPI using a deterministic value based on the measured maximum value and the minimum value of the non-deterministic section. The deterministic value may indicate a value that converges to a predetermined range by repeatedly measuring the maximum value and the minimum value. As the measured value and an actual non-deterministic execution section value become more similar, $T_{nd}$, where $T_{nd}=T_{physical}-T_{logical}$, becomes smaller, thereby decreasing a waiting time $T_{wait}$. The above method of correcting the core DPI using the deterministic value may be referred to as a DPI fast-forward (DFF) method.

The core DPI correction unit 560 may correct the core DPI by providing an API "DetermSWNDClearWithDFF( )" as given by:

```
void DetermSWNDClearWithDFF(uint32 dffValue) {
    ClearNDFunctionFlag( );
    MyCore->DPI += dffValue;
    ClearDPCEnable( );
}
```

Figure 6:
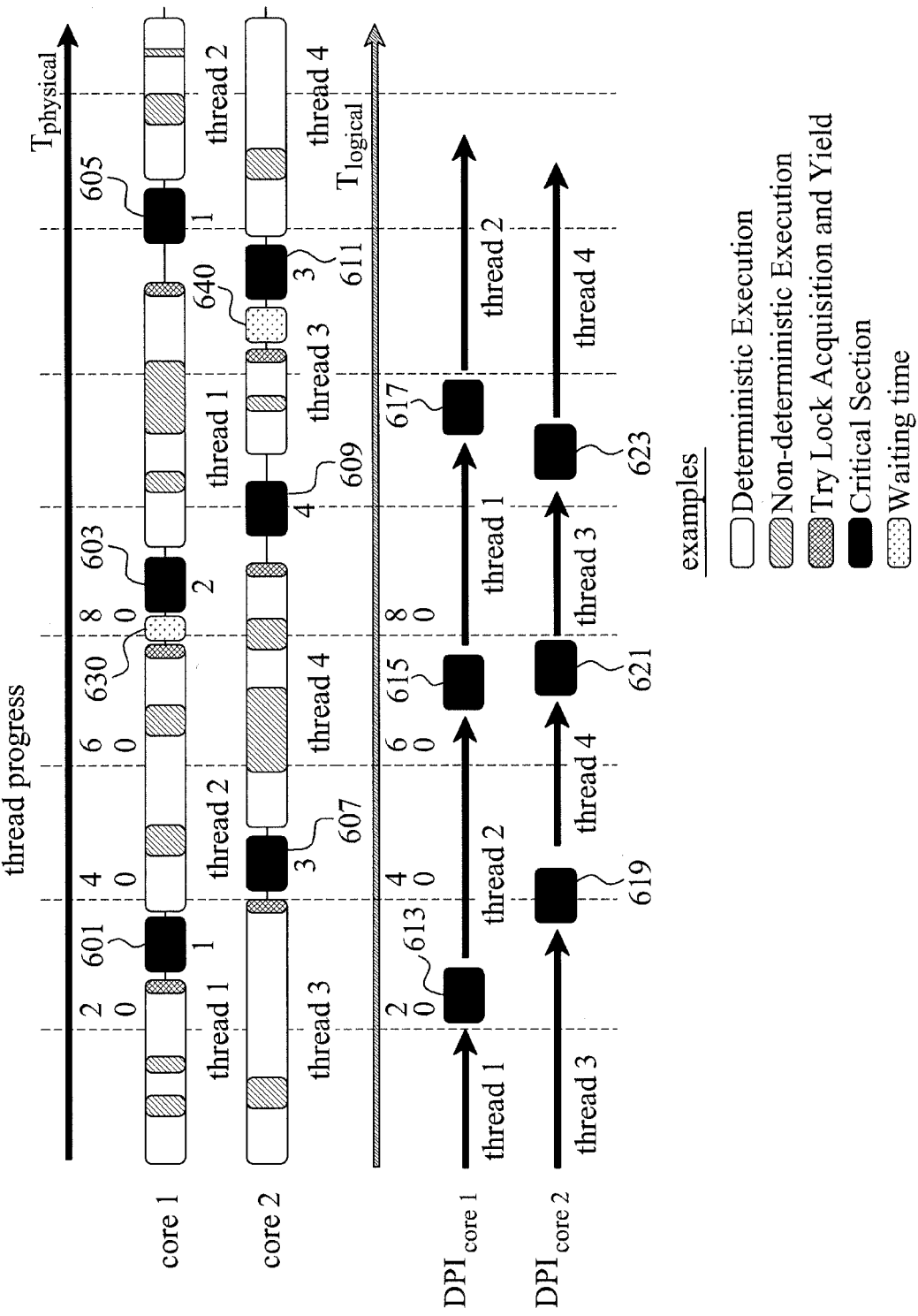
FIG. 6 illustrates an IBLA when using a core DPI according to example embodiments.

FIG. 6 illustrates an IBLA when using a core DPI according to example embodiments.

Referring to FIG. 6, thread (1) and thread (2) are executed in core 1, and thread (3) and thread (4) are executed in core 2. Similar to FIG. 4B, a lock acquisition pattern of a thread corresponds to an IBLA pattern. Since the core DPI is used in FIG. 6, DPIs of the thread (1) and the thread (2) may be used in $DPI_{core1}$, and DPIs of the thread (3) and the thread (4) may be used in $DPI_{core2}$. A lock acquisition order of each thread may be determined based on a case where a DPI of a core is smallest at a lock acquisition point in time, or where an ID of the core is relatively small when DPIs of cores are the same. Accordingly, when comparing DPIs of cores, the lock acquisition order may be determined in an order of thread (1) 613, thread (3) 619, thread (2) 615, thread (4) 621, thread (3) 623, thread (1) 617, thread (4), and thread (2). Referring to a process of threads being physically executed in actual cores, lock acquisition requests are in an order of thread (1) 601, thread (3) 607, thread (2) 603, thread (4) 609, thread (3) 611, and thread (1) 605, and thereby a critical section may be protected by lock.

Since the core DPI is used, controlling of the lock acquisition order may be deterministically performed. For example, when the core DPI is given, it is possible to predict the lock acquisition order. However, since the non-deterministic execution section is included in a section where a corresponding thread is substantially executed in a corresponding core, waiting times 630 and 640 may occur. The core DPI correction unit 560 may measure the maximum value and the minimum value of the non-deterministic execution section and correct the core DPI using the deterministic value. When the non-deterministic execution section is corrected using the deterministic value, a waiting time may decrease.

Figure 7:
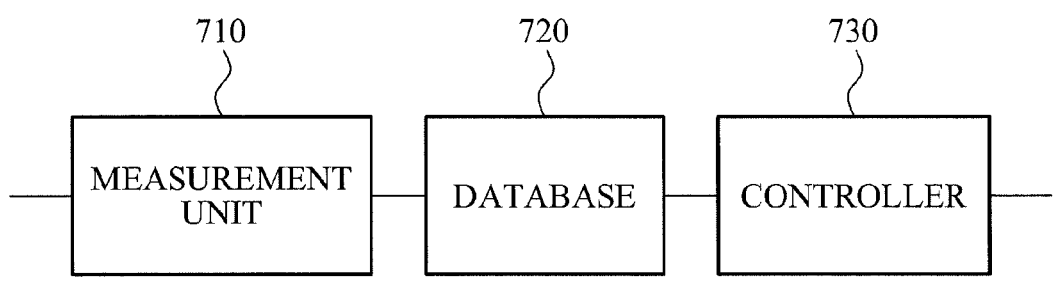
FIG. 7 illustrates a thread scheduling apparatus based on a DPI according to example embodiments.

FIG. 7 illustrates a thread scheduling apparatus based on a DPI according to example embodiments. Thread scheduling may correspond to determining of a thread execution order of a core that is executed in a core. A deterministic scheduling scheme may include a first in first out (FIFO) scheme and a round robin scheme. In the case of an IBLA pattern, a scheduling result may be different from a prediction. Accordingly, in the case of the IBLA pattern, a stable and applicable deterministic thread scheduling scheme may be used.

Referring to FIG. 7, the thread scheduling apparatus may include a measurement unit 710, a database 720, and a controller 730.

The measurement unit 710 may measure a DPI of a thread executed with respect to a predetermined input. A DPI for each thread may have the same value with respect to the same instruction input since the DPI is a value used to indicate a deterministically executed, that is, a predictable execution period. The measurement unit 710 may measure a DPI of a thread executed according to an instruction input. The measurement unit 710 may measure the DPI of the thread at a lock acquisition point in time.

The database 720 may store a DPI of each thread at the lock acquisition point in time based on the measured DPI. The database 720 may store a thread DPI used for thread scheduling. The database 720 may store a thread DPI at the lock acquisition point in time for each thread. The database 720 may include a duplication unit (not shown) to copy the measured thread DPI.

The controller 730 may schedule a thread execution order in an ascending order of a thread DPI at a next lock acquisition point in time from a corresponding lock acquisition point in time, based on the stored DPI of each thread. An operation system may manage and schedule threads constituting an application program so that system resources may be effectively used through the threads. The controller 730 may schedule the thread execution order based on each thread DPI stored in the database 720. The controller 730 may schedule a thread in an ascending order of a thread DPI.

The controller 730 may perform different thread scheduling depending on a type of an application program being executed. For example, when a video application program is parallel executed based on a single thread per channel in multiple cores, balanced load scheduling may be used for each channel. Accordingly, the controller 730 may perform thread scheduling in an ascending order of a thread DPI at a next lock acquisition point in time.

The controller 730 may schedule the thread execution order in an ascending order of an increased value in the thread DPI at the next lock acquisition from the corresponding lock acquisition point in time. The controller 730 may schedule a thread, having a relatively small increased value in the thread DPI, as a priority thread.

The controller 730 may schedule the thread execution order by providing an API "DoScheduleThredWithDPI( )" as given by:

```
void DoScheduleThredWithDPI(void) {
    /* find minimum next DPI thead_handle */
    next_thread_t = DoFindMimiumNextDPI(g_thread_ready_q);
    if (current_thread_t == next_thread_t) return;
    context_save(current_thread_t);
    next_thread_t->next_lock_counter + = 1;
    dispatch_new_thread(next_thread_t);
    return;
}
```

Figure 8:
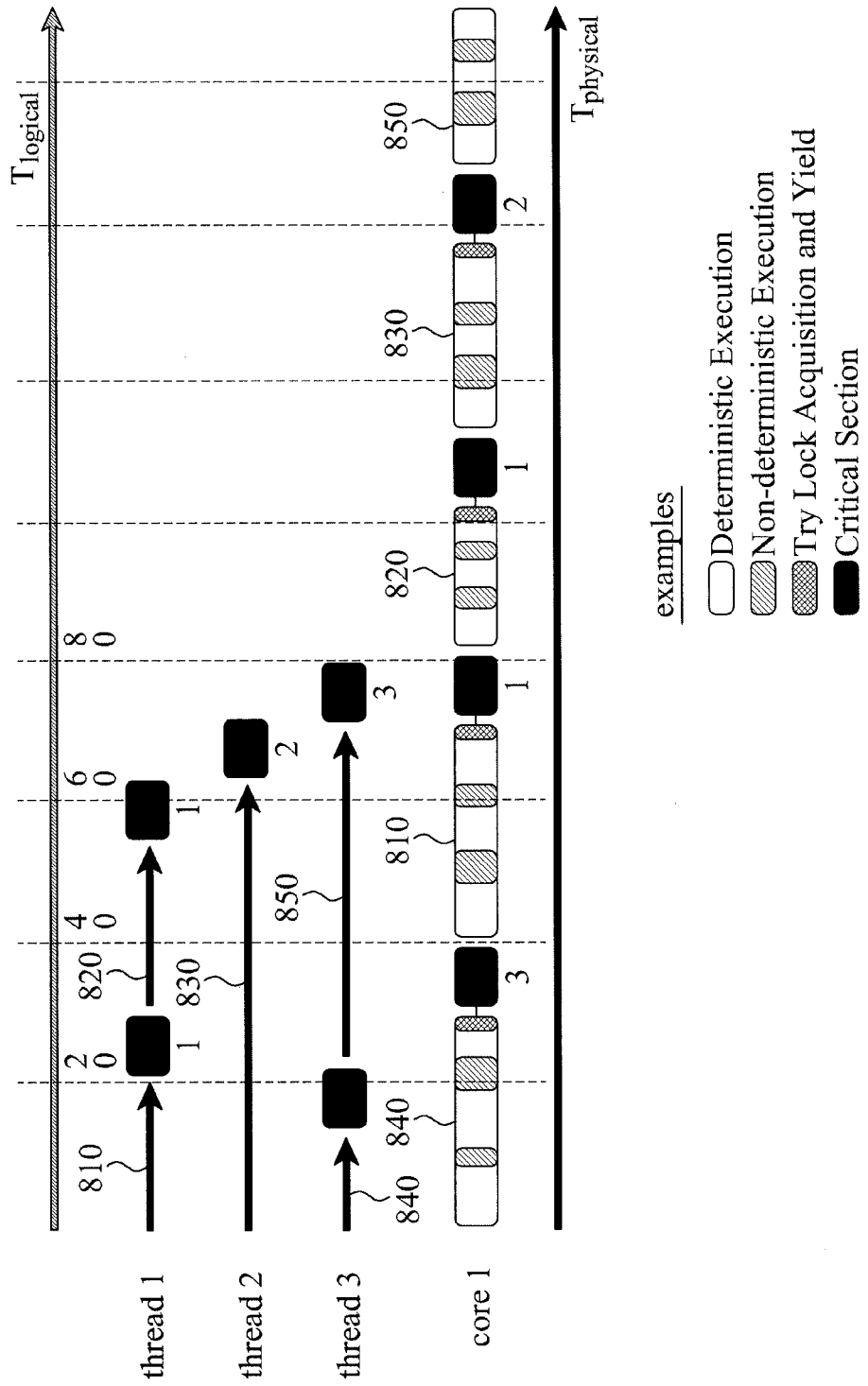
FIG. 8 illustrates an IBLA when using thread scheduling based on a DPI according to example embodiments.

FIG. 8 illustrates an IBLA when using thread scheduling based on a DPI according to example embodiments.

Referring to FIG. 8, thread (1) through thread (3) are executed in core 1. A lock acquisition pattern corresponds to an IBLA pattern. Accordingly, lock acquisition points in time of the thread (1) through the thread (3) may be different.

When thread scheduling based on the DPI is applied, thread (3) 840 may be most initially executed since the thread (3) 840 has a smallest thread DPI at an initial lock acquisition point in time. When comparing thread DPIs at a next lock acquisition, thread (1) 810 may be executed in a next order. Next, thread (1) 820, thread (2) 830, and thread (3) 850 may be sequentially executed. Accordingly, the thread execution order may be scheduled in an order of thread (3) 840, thread (1) 810, thread (1) 820, thread (2) 830, and thread (3) 850. It can be known that threads of the core 1 are executed in a scheduled order.

Figure 9A:
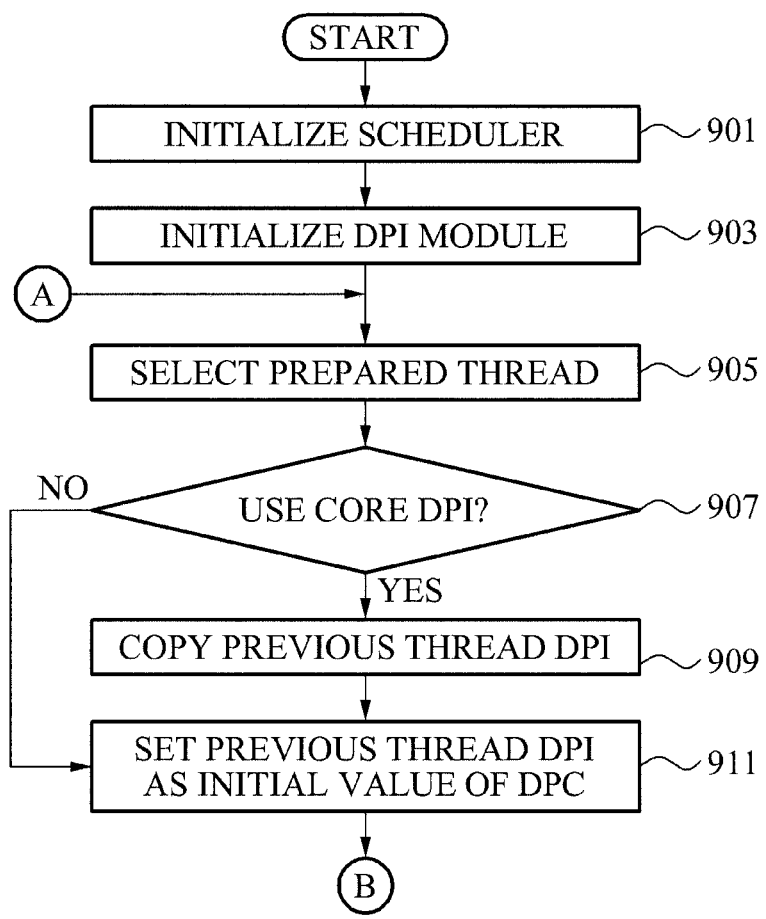
FIGS. 9A and 9B illustrate a method of generating a core DPI according to example embodiments.
Figure 9B:
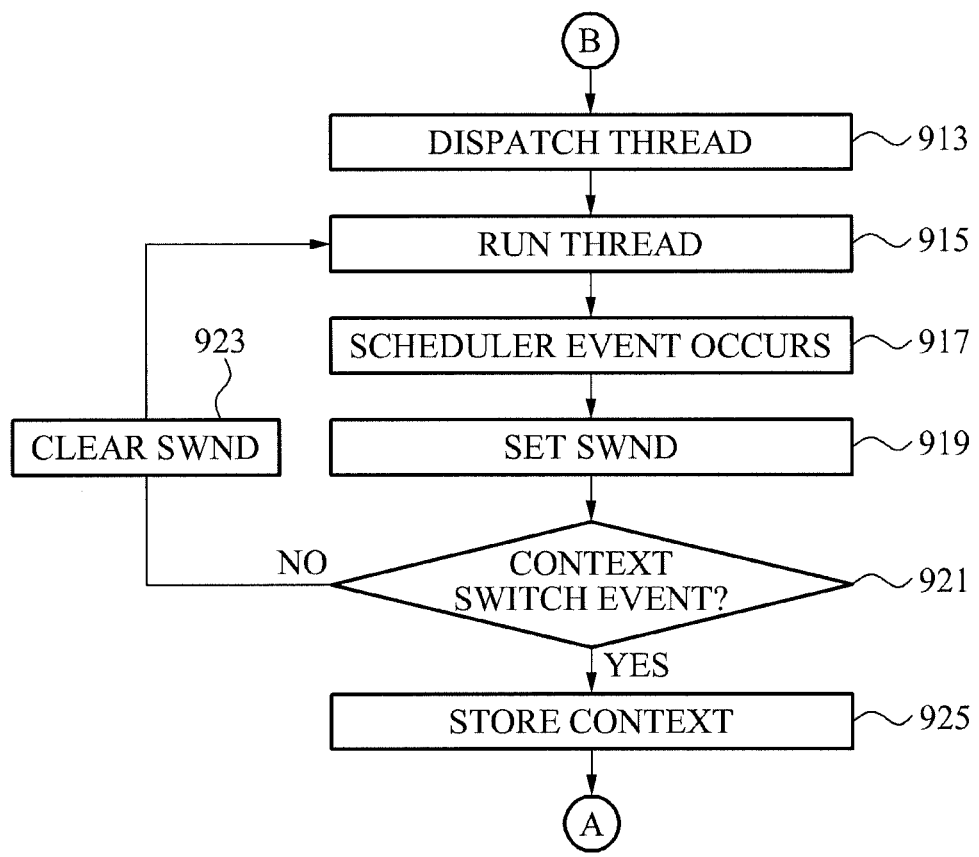

FIGS. 9A and 9B illustrate a method of generating a core DPI according to example embodiments.

In operations 901 and 903, a lock controlling apparatus based on a DPI may initialize a scheduler and a DPI module by an operating system. The initialization process may be performed to distinguish a new procedure from an existing procedure.

In operation 905, the lock controlling apparatus may select a thread prepared according to an instruction to be executed on the scheduler. The instruction to be executed may be different for each thread and thus, a corresponding thread may be selected based on a predetermined execution order of the scheduler.

In operation 907, the lock controlling apparatus may determine whether to use a core DPI. Whether to use the core DPI may be determined through a system setting. The core DPI may be used with respect to all the cases where threads are executed, or may be used only in a section arbitrarily determined by a user.

In operation 909, when the core DPI is determined to be used, the lock controlling apparatus may copy a previous thread DPI of a predetermined group. For example, the lock controlling apparatus may generate the core DPI using the previous thread DPI of the predetermined group. The predetermined thread group indicates a group of threads attempting a lock acquisition for access to the same shared resource. The lock controlling apparatus may generate a core DPI using a DPI of a previous thread as a DPI start point in time of a next thread when a context switch event occurs in the same core. The lock controlling apparatus may store the generated core DPI.

In operation 911, the lock controlling apparatus may set the copied previous thread DPI of the predetermined group as an initial value of a DPC. When the core DPI is not used, the selected thread DPI may be set as the initial value of the DPC. For example, the lock controlling apparatus may generate the core DPI by copying a DPI of a thread consecutively executed.

In operation 913 and 915 (See FIG. 9B), the lock controlling apparatus may dispatch a thread to be in a running state. The running state indicates a state where a DPI is generated by executing the thread according to a deterministic scheme.

In operations 917 and 919, when the scheduling event occurs in the thread that is in the running state, the lock controlling apparatus may suspend the DPC by setting a software non-deterministic execution (SWND) signal. SWND indicates a case where a non-deterministic execution is performed at a level of a randomly occurring event in an aspect of a function including instructions or software. A scheduler event may be, for example, an interrupt, and may include an input/output waiting, a non-deterministic function call, and the like.

In operation 921, the lock controlling apparatus may determine whether the context switch event occurs in a state where the DPC is suspended. In operation 925, when the context switch event occurs, the lock controlling apparatus may store a value of the suspended DPC as a DPI value of a thread before the switch. Also, the lock controlling apparatus may store a context result performed by a point in time when the context switch occurs.

In operation 923, the lock controlling apparatus may operate the suspended DPC by clearing an SWND signal when the scheduler event is terminated in a state where the DPC is suspended.

The lock controlling apparatus may repeat the above procedure by selecting a thread prepared after the context switch.

Figure 10:
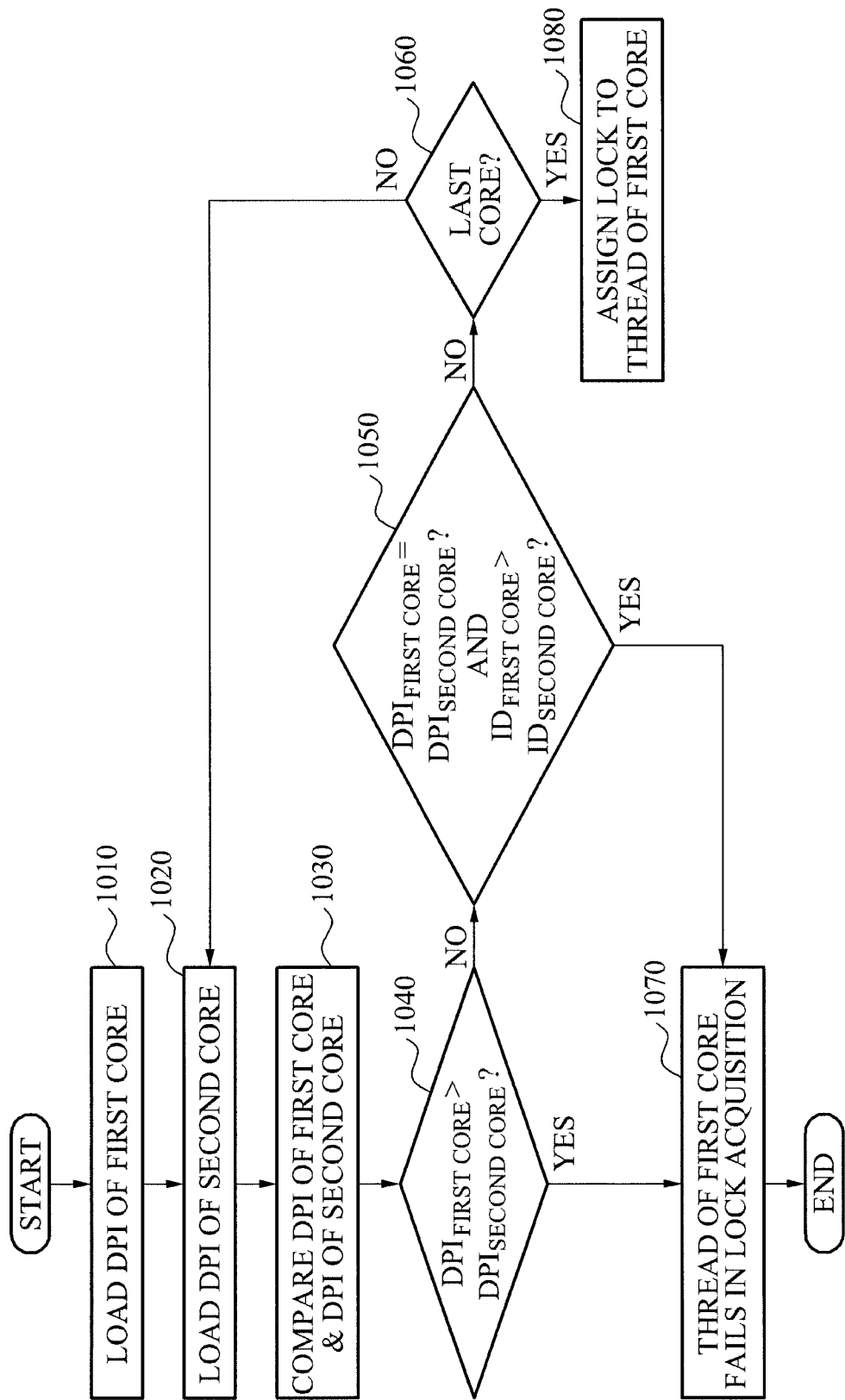
FIG. 10 illustrates a lock controlling method based on a DPI according to example embodiments.

FIG. 10 illustrates a lock controlling method based on a DPI according to example embodiments.

In operation 1010, a lock controlling apparatus based on the DPI may load a DPI of a first core among DPIs of a plurality of cores at a lock acquisition point in time of each thread. The lock controlling apparatus may correct the DPI of the first core by a measurement value of a non-deterministic section through an actual application execution. The lock controlling method may further include measuring a minimum value and a maximum value of the non-deterministic section. A correction may be performed by a deterministic measurement value based on the measured minimum value and maximum value. The deterministic measurement value may indicate a value that converges to a predetermined range by repeatedly measuring the maximum value and the minimum value.

In operation 1020, the lock controlling apparatus may load a DPI of a second core to be compared with the DPI of the first core.

In operation 1030, the lock controlling apparatus may compare the load DPI of the first core with the DPI of the second core.

In operation 1040, the lock controlling apparatus may determine whether the DPI of the first core has a value greater than the DPI of the second core. When the DPI of the first core has a value greater than the DPI of the second core, a thread of the first core may fail in the lock acquisition in operation 1070. When the DPI of the first core has a value less than or equal to the DPI of the second core, operation 1050 may be performed.

In operation 1050, when the DPI of the first core has the same value as the DPI of the second core, the lock controlling apparatus may determine whether an ID of the first core has a value greater than an ID of the second core. When the ID of the first core has the value greater than the ID of the second core, the thread of the first core may fail in the lock acquisition in operation 1070. When the ID of the first core is less than or equal to the ID of the second core, operation 1060 may be performed.

In operation 1060, the lock controlling apparatus may determine whether the second core to be compared corresponds to a last core. For example, whether the second core to be compared corresponds to a last core corresponds to a case where the DPI of the first core has a value less than the DPI of the second core, or where the DPI of the first core has the same value as the DPI of the second core, however, the ID of the first core is less than the ID of the second core.

In operation 1080, when the second core corresponds to the last core, the lock controlling apparatus may assign a lock to the thread of the first core. Assigning of the lock to the tread has the same meaning as lock acquisition of the thread. Conversely, when the second core does not correspond to the last core, operation 1020 of loading a new third core among a plurality of cores may be performed.

Figure 11:
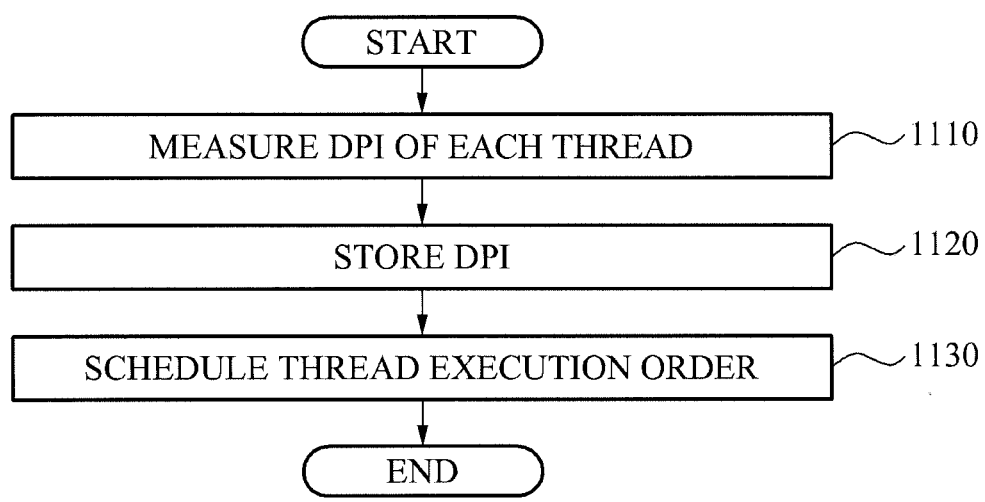
FIG. 11 illustrates a thread scheduling method based on a DPI according to example embodiments.

FIG. 11 illustrates a thread scheduling method based on a DPI according to example embodiments.

In operation 1110, a thread scheduling apparatus may measure a DPI of a thread to be executed with respect to a predetermined input.

In operation 1120, the thread scheduling apparatus may store a DPI of each thread at a lock acquisition point in time based on the measured DPI of the thread. The thread scheduling apparatus may store each thread DPI to be distinguished for each thread.

In operation 1130, the thread scheduling apparatus may schedule a thread execution order in an ascending order of a thread DPI at a next lock acquisition point in time from a corresponding lock acquisition point in time based on the stored DPI of each thread. The thread scheduling apparatus may schedule a thread to be initially executed in a core, as a thread having a smallest thread DPI. The thread scheduling apparatus may schedule the thread execution order in an ascending order of an increased value in the thread DPI at the next lock acquisition from the corresponding lock acquisition point in time.

According to example embodiments, a lock controlling method based on a DPI may reduce lock acquisition order selection overhead affecting a performance in a BLA pattern, based on a core DPI. The lock controlling method may reduce waiting overhead of a prior thread affecting a performance in an IBLA pattern.

According to example embodiments, a thread scheduling method based on a DPI may deterministically schedule a thread execution order even in an IBLA pattern.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A lock controlling apparatus for threads, based on a deterministic progress index (DPI), the apparatus comprising:
   a tracker to track, for each thread of a plurality of threads of a predetermined thread group executing on a multi-core system, a thread DPI comprising a value which is incremented at regular intervals during deterministic sections of the thread's execution and which is not incremented during non-deterministic sections of the thread's execution, where a nondeterministic section comprises a section whose execution period is unpredictable, where the threads of the predetermined thread group are each assigned to execute on a corresponding one of the cores of the multi-core system such that each core is assigned at least one of the threads and at least one of the cores is assigned at least two of the threads;
   storage to store, for each of the cores, a core DPI at a shared memory location accessible by each of the cores, where the core DPI of a core comprises an accumulative total of the thread DPIs of the threads of the predetermined thread group assigned to the core;
   a loader to load the stored core DPIs in response to a first thread of the thread group assigned to a first core of the multi-core system attempting to acquire a lock;
   a comparator to compare the DPI of the first core to each of the other loaded core DPIs; and
   a controller to assign the lock to the first thread when the loaded core DPI of the first core is less than the other loaded core DPIs.

2. The apparatus of claim 1, wherein when none of the other loaded core DPIs is greater than the loaded core DPI of the first core, the loaded core DPI of the first core has a same value as the DPI of a second core, and an identification (ID) of the first core has a value less than an ID of the second core, the controller assigns the lock to the first thread of the first core.

3. The apparatus of claim 1, wherein the predetermined thread group corresponds to a group of threads attempting a lock acquisition to access a same shared resource.

4. The apparatus of claim 1, further comprising:
   a core DPI corrector to adjust the DPI of the first core by a measurement value of a nondeterministic execution section through actual execution of a thread of the first core.

5. A lock controlling method for threads based on a deterministic progress index (DPI), the method comprising:
   tracking, for each thread of a plurality of threads of a predetermined thread group executing on a multi-core system, a thread DPI comprising a value which is incremented at regular intervals during deterministic sections of the thread's execution and which is not incremented during non-deterministic sections of the thread's execution, where a nondeterministic section comprises a section whose execution period is unpredictable, where the threads of the predetermined thread group are each assigned to execute on a corresponding one of the cores of the multi-core system such that each core is assigned at least one of the threads and at least one of the cores is assigned at least two of the threads;
   storing, for each of the cores, a core DPI at a shared memory location accessible by each of the cores, where the core DPI of a core comprises an accumulative total of the thread DPIs of the threads of the predetermined thread group assigned to the core;
   loading the stored core DPIs in response to a first thread of the thread group assigned to a first core of the multi-core system attempting to acquire a lock;
   comparing the DPI of the first core to each of the other loaded core DPIs; and
   assigning the lock to the first thread when the loaded core DPI of the first core is less than the other loaded core DPIs.

6. The method of claim 5, wherein the assigning comprises assigning the lock to the first thread of the first core when none of the other loaded core DPIs is greater than the loaded core DPI of the first core, the loaded core DPI of the first core has a same value as the DPI of a second core, and an identification (ID) of the first core has a value less than an ID of the second core.

7. The method of claim 5, further comprising:
   generating a core DPI using a DPI of a previous thread as a DPI start point of a next thread when a context switch event occurs in a same core and the previous thread and the next thread are in a same predetermined thread croup; and storing the core DPI generated.

8. The method of claim 5, further comprising:

adjusting the DPI of the first core by a determined value of a non-deterministic execution section through actual execution of a thread of the first core.

9. The method of claim 8, further comprising:

measuring a minimum value and a maximum value of the non-deterministic execution section, wherein the adjusting comprises correcting the DPI of the first core by a deterministic measurement value based on the minimum value and the maximum value measured.

* * * * *